United States Patent
Sudo

(10) Patent No.: US 8,089,696 B2
(45) Date of Patent: Jan. 3, 2012

(54) ILLUMINATION OPTICAL SYSTEM AND IMAGE PROJECTOR USING SAME

(75) Inventor: Takashi Sudo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 12/467,085

(22) Filed: May 15, 2009

(65) Prior Publication Data

US 2009/0284838 A1    Nov. 19, 2009

(30) Foreign Application Priority Data

May 19, 2008    (JP) .................................. 2008-130620

(51) Int. Cl.
*G02B 27/10*    (2006.01)

(52) U.S. Cl. ....................................... 359/622; 359/619

(58) Field of Classification Search .................. 359/622, 359/619, 620, 621
See application file for complete search history.

(56) References Cited

U.S. PATENT DOCUMENTS 6,133,687 A * 10/2000 Clarke ......................... 313/478
6,552,760 B1 * 4/2003 Gotoh et al. .................... 349/56

FOREIGN PATENT DOCUMENTS

JP    07-181392 A    7/1995

* cited by examiner

*Primary Examiner* — James Greece
(74) *Attorney, Agent, or Firm* — Canon USA Inc IP Division

(57) ABSTRACT

An illumination optical system has a condenser, a first lens array, a second lens array, and a polarized beam splitting surface. The condenser and the first and second lens arrays compress light incident on the condenser. The distance between a lens cell in the first lens array and a lens cell in the second lens array is appropriately set, whereby an illuminated surface is illuminated brightly and efficiently without significant loss of light amount.

15 Claims, 14 Drawing Sheets

ILLUMINATION OPTICAL SYSTEM AND IMAGE PROJECTOR USING SAME

BACKGROUND OF THE INVENTION

1. Field of the Invention

The present invention relates to an illumination optical system that illuminates an illuminated surface using light emitted from a light source. The present invention further relates to an image projector that illuminates an image display element such as a liquid crystal panel provided on an illuminated surface using the illumination optical system and projects light from an image display element onto a projected surface such as a screen.

2. Description of the Related Art

In recent years, there have been developed various image projectors that project light modulated according to image information using an image display element such as a liquid crystal display element onto a screen or the like at a magnified size (see Japanese Patent Application Laid-Open No. H07-181392).

FIG. 16 schematically shows an image projector disclosed in Japanese Patent Application Laid-Open No. H07-181392.

In the image projector shown in FIG. 16, light emitted from a light source 102 is split into a plurality of bundles of light by a fly eye lens 301, and emerging light is converged with respect to the y direction. The light emerging from the fly eye lens 301 is condensed by a second fly eye lens 302.

The light emerging from the second fly eye lens 302 is used to illuminate a liquid crystal panel 109 via a color splitting system 107 and a collimator lens 108.

In the image projector shown in FIG. 16, the lens cells in the peripheral portion of the first fly eye lens 301 each have a center of curvature radius that is decentered toward the center of the first fly eye lens 301. Thus, the width of light emerging from the first lens unit 301 decreases or narrows with respect to the y direction before entering the second fly eye lens 302, and the angle of light incident on the color splitting system 107 also becomes smaller. In this optical system, the angular range of light incident on the surface of a polarized beam splitting film in the color splitting system 107 is also decreased, and therefore good image contrast characteristics are achieved.

In the illumination optical system disclosed in Japanese Patent Application Laid-Open No. H07-181392, light is condensed with respect to the y direction by the first fly eye lens 301, and there is a step (or difference in height) between adjacent lens cells in the first fly eye lens 301 as shown in FIG. 16.

If there are steps between lens cells of a fly eye lens as is the case with that shown in FIG. 16, manufacturing of the fly eye lens by molding is not easy. In addition, illuminating light is partly cut by the step portions, which leads to a decrease in the illumination efficiency.

SUMMARY OF THE INVENTION

An object of the present invention is to provide an illumination optical system that can illuminate an illuminated surface brightly at high efficiency without significant loss of light amount.

An exemplary illumination optical system according to the present invention has a condenser that converges light emerging from a light source, so that convergent light emerges from the condenser, a first lens array that converts convergent light emerging from the condenser into a plurality of parallel bundles of light in a first cross sectional plane that contains the optical axis of the illumination optical system, a second lens array that converts a plurality of convergent bundles of light emerging from the first lens array into a plurality of parallel bundles of light in a second cross sectional plane that contains the optical axis of the illumination optical system and perpendicular to the first cross sectional plane, and a polarized beam splitting surface that guides the plurality of bundles of light emerging from the second lens array to an illuminated surface. Light incident on the condenser is condensed by the condenser, the first lens array, and the second lens array. The second cross sectional plane is parallel to the normal of the polarized beam splitting surface. In the illumination optical system as described above, the distance between a lens cell in the first lens array and a lens cell in the second lens array is set appropriately.

Further features of the present invention will become apparent from the following description of exemplary embodiments with reference to the attached drawings.

DESCRIPTION OF THE EMBODIMENTS

Figure 1:
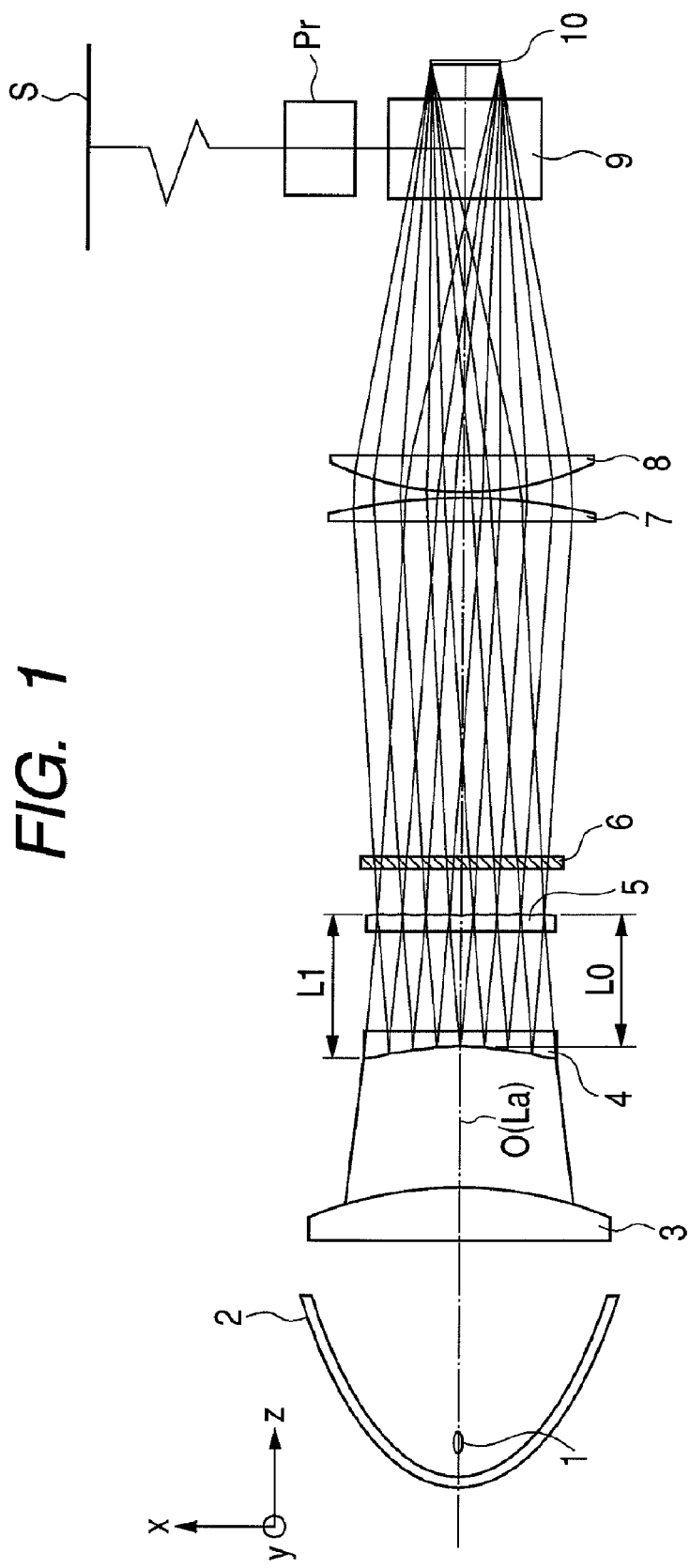
FIG. 1 is a diagram showing the configuration of a first embodiment of the present invention in the x-z cross section.

An illumination optical system according to an embodiment is an illumination optical system for illuminating an illuminated surface. The illumination optical system has a condenser, a first lens array, a second lens array, and a polarized beam splitting surface. Here, the condenser converges light emitted from a light source so that convergent light emerges from the condenser. The first lens array includes a plurality of lens cells and converts the convergent light emerging from the condenser into a plurality of parallel bundles of light (or parallel lights) in a first cross sectional plane that contains the optical axis of the illumination optical system. The second lens array includes a plurality of lens cells and converts a plurality of convergent bundles of light emerging from the first lens array into a plurality of parallel bundles of light in a second cross sectional plane that contains the optical axis of the illumination optical system and perpendicular to the first cross sectional plane. The polarized beam splitting surface is adapted to guide the plurality of bundles of light emerging from the second lens array to the illuminated surface. The condenser, the first lens array, and the second lens array compress light incident on the condenser. (In other words, the diameter of light emerging from the condenser is narrowed, and light emerges from the second lens array as parallel light. The aforementioned second cross sectional plane is substantially parallel with the normal of the polarized beam splitting surface. The first cross sectional plane is not parallel with the normal of the polarized beam splitting surface. Let L0 be the distance on the optical axis of the illumination optical system between the surface of a lens cell in the first lens array and the surface of a lens cell in the second lens array, let L1 be the distance along the optical axis direction between the surface of the outermost lens cell (i.e. the lens cell farthest from the optical axis) among the lens cells in the first lens array and the surface of the outermost lens cell among the lens cells in the second lens array, in the first cross sectional plane, and let L2 be the distance along the optical axis direction between the surface of the outermost lens cell among the lens cells in the first lens array and the surface of the outermost lens cell among the lens cells in the second lens array, in the second cross sectional plane. Then, the illumination optical system according to the embodiment is characterized by satisfying at least one of the following conditions (a) and (b).

(a) The value obtained by dividing the longer one of distances L0 and L1 by the shorter one of distances L0 and L1 is larger than 1 and smaller than 1.2; and (b) The value obtained by dividing the longer one of distances L0 and L2 by the shorter one of distances L0 and L2 is larger than 1 and smaller than 1.2.

It is preferred that the values of L1, L2, and L0 satisfy at least one of the following conditions:

$0.9 < L2/L1 < 1.1$, $1 < L1/L0 < 1.2$, and $1 < L2/L0 < 1.2$.

It is also preferred that the light compression ratio $\beta$ in the first cross sectional plane and the light compression ratio $\alpha$ in the second cross sectional plane satisfy the following conditions:

$\alpha < 1$, $\beta < 1$, and $\alpha < \beta$.

In the case where the lens cells are provided on only one of the surfaces of each of the first and second lens arrays, it is preferred that the surfaces provided with the lens cells in the respective lens arrays be arranged to face away from each other or, alternatively, to face each other.

It is also preferred that the position of the center of curvature of the each of the lens cells in the first lens array and the second lens array except for the lens cells at the center of the respective lens arrays be decentered in a direction away from the optical axis in the first cross sectional plane or the second cross sectional plane.

The image projector according to this embodiment has an image display element and the aforementioned illumination optical system that illuminates the image display element. Furthermore, it is more preferred that the image projector have a projection optical system that projects an image of the image display element.

In the following, first to third exemplary embodiments will be described in detail with reference to the accompanying drawings.

First Embodiment

FIG. 1 schematically illustrates the relevant portions of an image projector having an illumination optical system according to a first embodiment of the present invention. FIG. 1 shows a cross section taken on a plane containing the center axis 0 (or the optical axis La) FIG. 2 also illustrates the relevant portions of the image projector in a cross section taken on a plane containing the center axis 0 in FIG. 1 and perpendicular to the plane of FIG. 1.

The illumination optical system according to this embodiment has a condenser that converges the light emitted from a light source so that convergent light emerges from the condenser and a collimator that collimates the light emerging from the condenser so that parallel light emerges from the collimator.

The illumination optical system further has a polarization conversion element that aligns (or uniformizes) the polarization state of light emerging from the collimator and a condenser lens system that condenses light having an uniform polarization state emerging from the polarization conversion element. The illumination optical system further has a polarized beam splitter having a polarized beam splitting surface that makes light from the condenser lens system incident on the image display element provided at the illuminated surface. The normal of the polarized beam splitting surface of the polarized beam splitter is parallel to the y-z plane (or the second cross sectional plane) but not parallel to the x-z plane (or the first cross sectional plane). The normal of the polarized beam splitting surface of the polarization conversion element is parallel to the x-z plane (or the first cross sectional plane) but not parallel to the y-z plane (or the second cross sectional plane).

Figure 2:
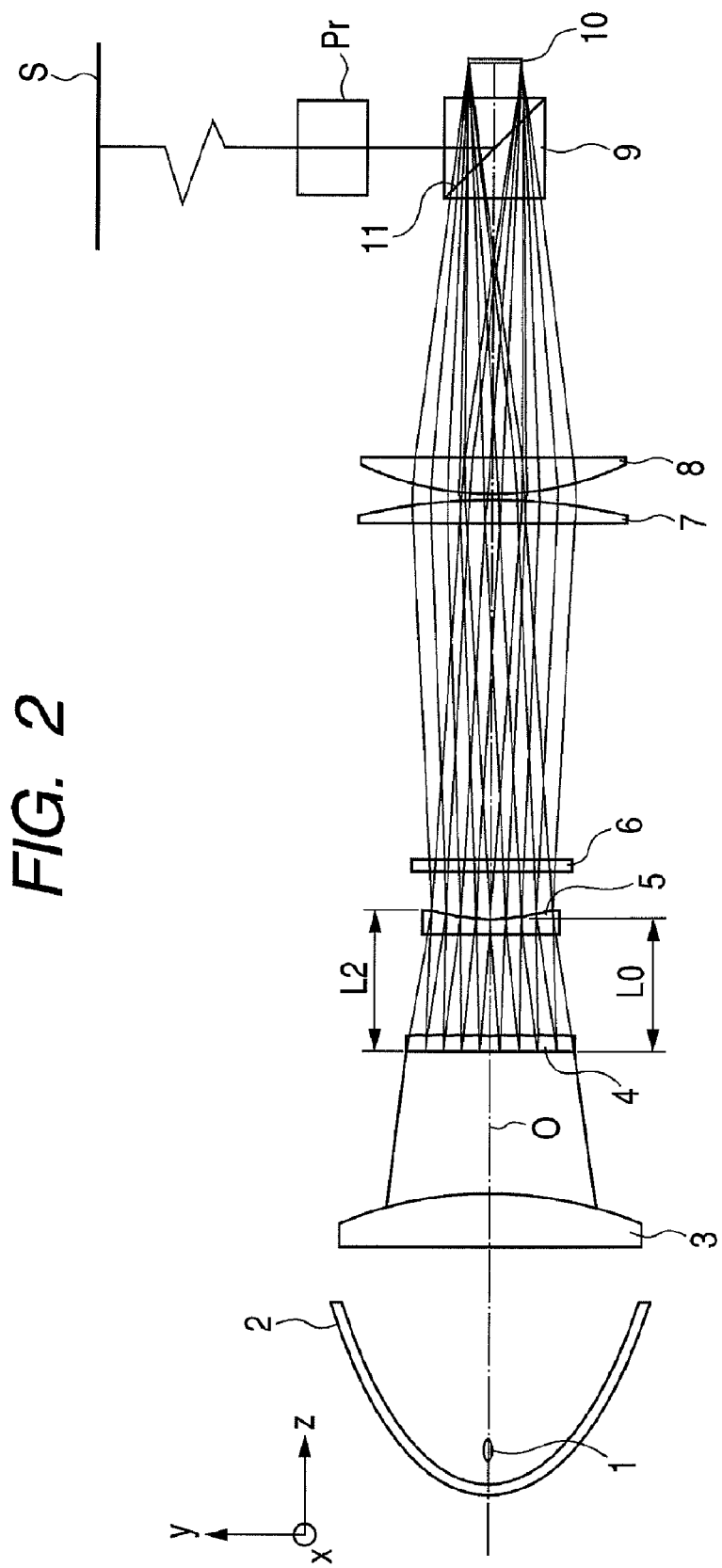
FIG. 2 is a diagram showing the configuration of the first embodiment of the present invention in the y-z cross section.

Referring to FIGS. 1 and 2, the image projector is provided with a light source 1, such as a high pressure mercury lamp (which may be a metal halide lamp, alternatively), that radiates white light, and a reflector 2 having a concave mirror surface that efficiently reflects light emitted from the light source 1.

A condenser lens 3 condenses light coming from the reflector 2. The reflector 2 and the condenser lens 3 constitute the condenser.

A first lens array (or first fly eye lens) 4 separates light emerging from the condenser lens 3 into a plurality of bundles of light. A second lens array (or second fly eye lens) 5 is opposed to the first fly eye lens 4.

The first and second fly eye lenses 4, 5 constitute the collimator. The collimator performs collimation, which means that light (or a ray) incident on the center of a lens cell in the fly eye lens (or lens array) is rendered parallel to the optical axis. In other words, "collimation" means to make the principal ray (or central ray) of each of the plurality of separated bundles of light parallel to the optical axis of the illumination optical system.

A polarization conversion element 6 has a polarized beam splitting surface, which reflects light having a specific polarization state and transmits light having a polarization state that is orthogonal to the aforementioned specific polarization state. The normal of the polarized beam splitting surface of the polarization conversion element is substantially parallel to the x-z plane (or the first cross sectional plane) as shown in FIG. 1.

The image projector has a first condenser lens 7 and a second condenser lens 8. The first and second condenser lenses 7, 8 constitute a condenser lens system. The image projector further has a polarized beam splitter 9.

The image projector is provided with a reflection type liquid crystal display panel 10 (which will be referred to as the "LCD panel" hereinafter), which is the illuminated object (or image display element).

The image projector is also provided with a projection optical system Pr, which projects image information representing an image displayed on the panel 10 onto a screen S.

Here, directions of the x, y, and z axes in FIGS. 1 and 2 will be described. The plane defined by the normal of the polarized beam splitting surface 11 of the polarized beam splitter 9 and the center axis 0 of the illumination light is referred to as the first plane (i.e. the first cross sectional plane, or the y-z plane), which is the cross sectional plane shown in FIG. 2. The y axis is taken along the direction parallel to this first plane and perpendicular to the center axis 0. The x axis is taken along the direction perpendicular to both the y axis and the center axis 0. The z axis is taken along the direction of the center axis 0 of the illumination light.

The plane containing the center axis 0 and parallel to the x axis direction is referred to as the second plane (i.e. the second cross sectional plane). FIG. 1 shows the configuration of the image projector according to the first embodiment on the x-z plane (i.e. the second plane or the second cross sectional plane), and FIG. 2 shows the configuration on the y-z plane (i.e. the first cross sectional plane).

In the case where the LCD panel 10 has a rectangular shape, the longer side thereof is oriented parallel to the x axis, and the shorter side thereof is oriented parallel to the y axis.

The collimator includes the first fly eye lens 4 in which a plurality of lens cells are arranged two-dimensionally. Each lens cell of the first fly eye lens 4 renders light coming from the condenser composed of the reflector 2 and the condenser lens 3 into parallel light in the second cross sectional plane shown in FIG. 1.

The collimator further includes the second fly eye lens 5 in which a plurality of lens cells are arranged two-dimensionally. Each lens cell of the second fly eye lens 5 renders light coming from the condenser into parallel light in the first cross sectional plane shown in FIG. 2.

The collimator composed of the first fly eye lens 4 and the second fly eye lens 5 condenses light in the first cross sectional plane and the second cross sectional plane at different compression ratios respectively.

In each of the first and second fly eye lenses 4 and 5, a plurality of lens cells are arranged two-dimensionally.

Figure 3:
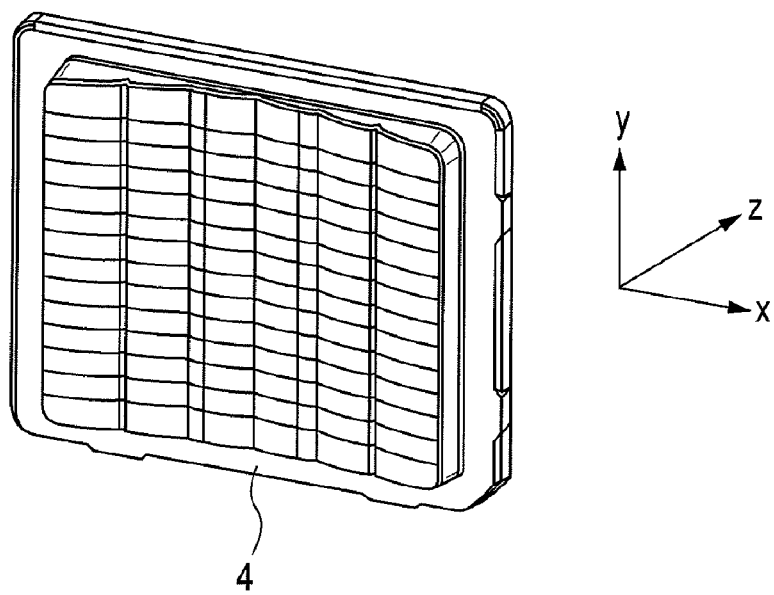
FIG. 3 is a perspective view of a first fly eye lens in the first embodiment of the present invention.
Figure 4:
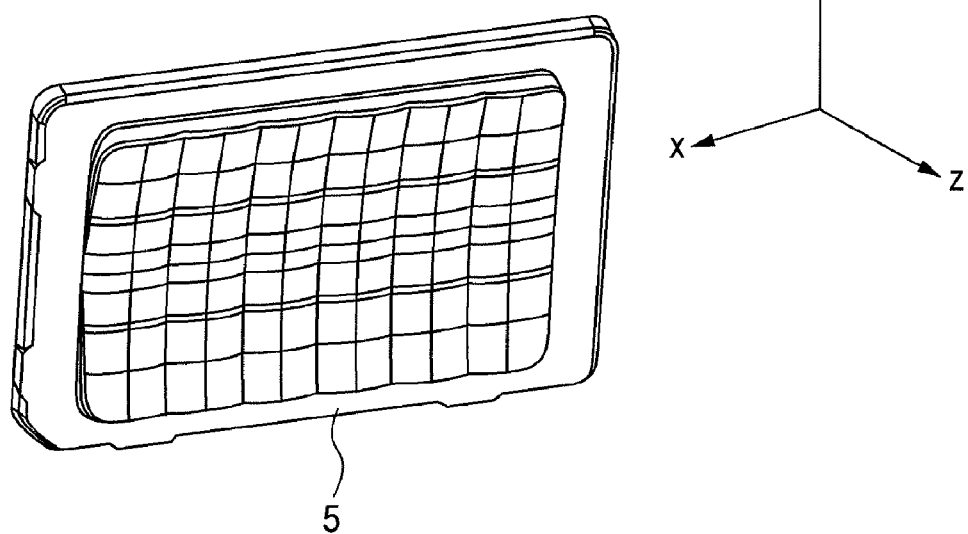
FIG. 4 is a perspective view of a second fly eye lens in the first embodiment of the present invention.

FIG. 3 is a perspective view of the first fly eye lens 4, and FIG. 4 is a perspective view of the second fly eye lens 5. The surfaces of the first and second fly eye lenses 4 and 5 on which lens arrays are provided are arranged to face away from each other.

Figure 5:
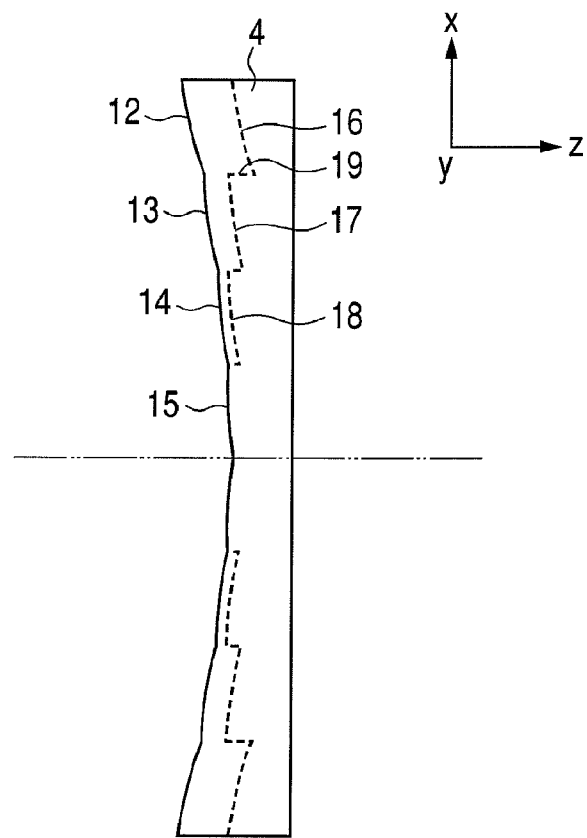
FIG. 5 is a diagram illustrating the shape of the first fly eye lens in the first embodiment of the present invention.
Figure 6:
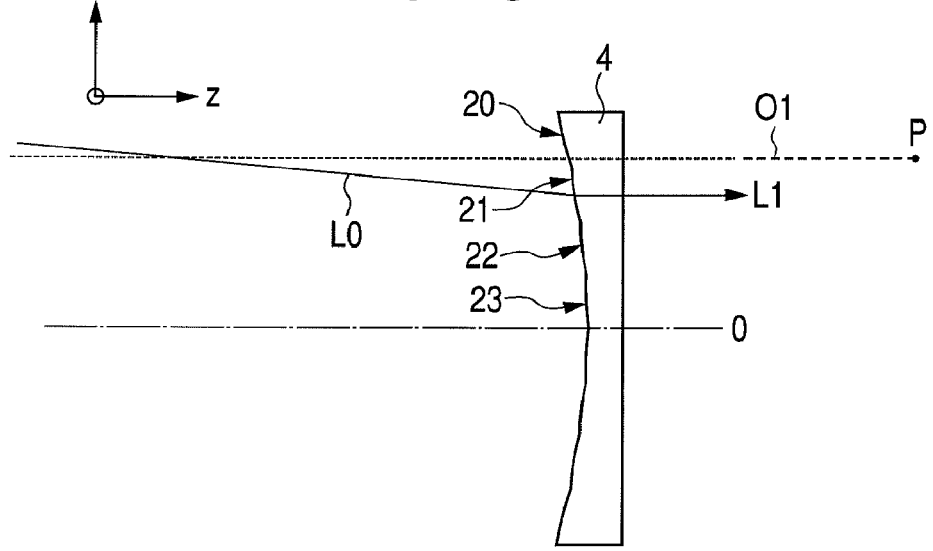
FIG. 6 is a diagram illustrating the optical effect of the first fly eye lens in the first embodiment of the present invention.

FIGS. 5 and 6 illustrate the first fly eye lens 4.

The position P of the center of curvature of each lens cell in the first fly eye lens 4 is decentered outwardly away from the center axis 0 with respect to the x direction.

In this embodiment, since the position P of the center of curvature of each of the lens cells in the peripheral portion of the lens array are decentered outwardly, if the lens cells had the same thickness as shown by broken lines 16, 17, 18 in FIG. 5, there would be steps between the lens cells.

To eliminate such steps 19 in FIG. 5, the lens cells are designed to have increased thicknesses as shown by solid lines in FIG. 5. Thus, the fly eye lens 4 has a lens cell 12 located at a position displaced from the lens cell 16 with respect to the optical axis direction. The fly eye lens 4 also has lens cells 13 and 14 located at positions displaced from the lens cells 17 and 18 respectively.

Thus, the closer to the periphery of the lens array a lens cell is located, the larger the thickness of the lens cell is.

In the case of the lens cells in the second fly eye lens 5, the closer to the periphery of the lens array with respect to the y direction a lens cell is located, the larger the thickness of the lens cell is, in a manner similar to the case of the first fly eye lens 4.

As described above, in this embodiment, the lens cells in the first fly eye lens 4 and the second fly eye lens 5 other than the lens cells in the central portions of the respective fly eye lenses each have the center of curvature decentered outwardly away from the center axis 0 of the illumination optical system in the first cross sectional plane or in the second cross sectional plane.

Figure 17:
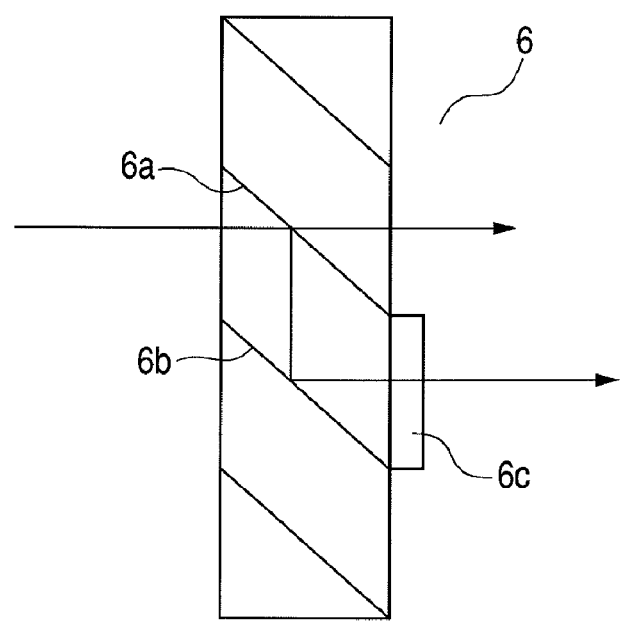
FIG. 17 is a diagram illustrating a polarization conversion element in an illumination optical system according to the present invention.

FIG. 17 illustrates a portion of the polarization conversion element 6.

The polarization conversion element 6 is provided on the light emerging side of the collimator or in the optical path in the collimator.

The polarization conversion element 6 has a plurality of polarized beam splitting surfaces 6a, a plurality of reflecting surfaces 6b, and a plurality of half wave plates 6c.

Specifically, the polarization conversion element 6 used here is an optical element (polarization conversion element) in which a plurality of sets of optical elements, each including a polarized beam splitting surface 6a, a reflecting surface (which may be polarized beam splitting surface, alternatively) 6b, and a half wave plate 6c are arranged (along a direction substantially perpendicular to the optical axis) in an array.

As such, the polarization conversion element 6 used herein may be referred to as a polarization conversion element array. If light is incident on each polarized beam splitting surface 6a in the polarization conversion element 6, a polarization component of the light that has a specific polarization direction is transmitted through it and emerges from the polarization conversion element 6.

On the other hand, the polarization component of the light incident on each polarized beam splitting surface 6a that has a polarization direction perpendicular to the aforementioned specific polarization direction is reflected by the polarized beam splitting surface 6a, and then further reflected by the reflecting surface 6b. Thereafter, the polarization direction of this light is rotated by 90 degrees by the half wave plate 6c and the light emerges from the polarization conversion element 6.

In this way, the polarization conversion element 6 converts unpolarized light incident thereon into linearly polarized light having a specific polarization direction, and such linearly polarized light emerges from it.

The half wave plate 6c may be provided only on the optical path of light that has been transmitted through the polarized beam splitting surface 6a. The polarization conversion element 6 may be configured to convert unpolarized light into linearly polarized light for each color of light (i.e. for each wavelength range corresponding to each panel), and the directions of linear polarization of the respective colors is not necessarily required to be the same.

Light emitted from the light source 1 is reflected by the reflector 2 having a paraboloidal reflecting surface and incident on the condenser lens 3 as parallel light. The light incident on the condenser lens 3 is converged by a positive refracting power of the condenser lens 3 and the light is incident on the first fly eye lens 4 as convergent light. The light incident on the first fly eye lens 4 is divided into a plurality of bundles of light by the plurality of lens cells, and thereafter forms a plurality of images of the light source (secondary light source images) on or in the vicinity of the light incidence surface of the polarization conversion element 6 through the second fly eye lens 5.

The bundles of light radiated from the plurality of light source images thus formed are transmitted through the polarization conversion element 6 whereby the polarization is aligned to a specific polarization direction, then emerge from the polarization conversion element, and are condensed by the first condenser lens 7 and the second condenser lens 8. Then the bundles of light originating from the plurality of light source images are transmitted through the polarized beam splitting prism 9 and superimposed on the surface of the LCD panel 10 to illuminate the LCD panel 10.

Thus, the LCD panel 10 is illuminated by illumination light having a uniform distribution. Light that has been image-modulated and reflected by the LCD panel 10 is reflected by the polarized beam splitting surface 11 of the polarized beam splitter 9 and guided to the projection lens (or projection optical system) Pr.

Although only one LCD panel 10 is shown in this embodiment, a typical color projector is actually provided with one or more image display elements or three LCD panels for R (red) light, G (green) light, and B (blue) light.

The polarized beam splitter 9 constitutes a part of a so-called color splitting and compositing optical system that guides R illumination light, G illumination light, and B illumination light respectively to the three LCD panels and composites or synthesizes image light of respective colors coming from the three LCD panel.

In this embodiment, the convergent light reflected from the reflector 2 is collimated into parallel light in the x-z cross sectional plane shown in FIG. 1 by the first fly eye lens 4. The light is also collimated into parallel light in the y-z cross sectional plane shown in FIG. 2 by the second fly eye lens 5.

Thus, in the x-z cross sectional plane, the light is compressed by the compressor system (or collimator) composed of the reflector 2 and the first fly eye lens 4. In the y-z cross sectional plane, the light is compressed by the compressor system (or collimator) composed of the reflector 2 and the second fly eye lens 5.

As described above, in this embodiment, the light emerging from the reflector 2 is convergent light, and the light is compressed at a higher light compression ratio (or collimation magnification) in the y-z cross sectional plane than in the x-z cross sectional plane by virtue of the difference in the distance from the reflector 2 to the first fly eye lens 4 and the distance from the reflector 2 to the second fly eye lens 5.

Therefore, the variation of the angle of light is made smaller with respect to the direction (the y-z cross sectional plane) in which optical characteristics of the polarized beam splitting prism 9 are more sensitive to the variation in the angle of light, thereby reducing brightness unevenness and decrease in contrast and projecting a bright image.

The variation in the angle of light is also made small with respect to the direction (the x-z cross sectional plane) in which optical characteristics of the polarized beam splitting prism 9 are less sensitive. This can contribute to a reduction in brightness unevenness and decrease in contrast more effectively than in cases where the variation in the angle of light is larger in this direction.

In this embodiment, the variation in the angle of incidence of light on the surface of the LCD panel 10 is larger in the x-z cross sectional plane (or the second cross sectional plane) shown in FIG. 1 that is parallel to the longer side of the LCD panel 10 than in the y-z cross sectional plane (or the first cross sectional plane) shown in FIG. 2 that is parallel to the shorter side of the LCD panel 10.

The image projector has the collimator including the first fly eye lens 4 and the second fly eye lens 5 provided between the light source 1 and the polarized beam splitting prism 9 to compress light in the first cross sectional plane (or the y-z cross sectional plane) and the second cross sectional plane (or the x-z cross sectional plane) that are perpendicular to each other in the illumination optical system.

The compression ratio (or the collimation magnification) in condensation in the first cross sectional plane by the collimator and that in the second cross sectional plane are different from each other.

Here, compression of light means that the diameter of light is decreased by the condenser and collimated into parallel light by the collimator.

The compression ratio is defined as the value L/Lr obtained by dividing the width L (LX, LY) of light incident on the collimator by the width Lr of the light (i.e. the diameter of light along a direction perpendicular to the optical axis) just after the emergence from the condenser. Here, in a case that the collimator includes a reflector provided at a position closest to the light incident side, the width of light incident on the collimator is directed to an aperture diameter of the reflector. In the present embodiment, since the reflector 2 is the paraboloidal reflecting surface, the width of light incident on the collimator substantively coincides with the width of light incident on the condenser lens 3.

Let $\beta$ be the light compression ratio in the first cross sectional plane (or the y-z cross sectional plane), and let $\alpha$ be the light compression ratio in the second cross sectional plane (or the x-z cross sectional plane).

Then, $\beta$=LX/Lr, and $\alpha$=LY/Lr.

Here, $\alpha \neq \beta$, $\alpha<1$, $\alpha<1$, and $\alpha<\beta$.

In the following, the optical effects of the first and second fly eye lenses 4, 5 will be described. As shown in FIGS. 1 and 2, the light emitted from the light source 1 is incident on the condenser lens 3 after reflected by the reflector 2. The light emerging from the condenser lens 3 is convergent light and incident on the first fly eye lens 4.

Here, a ray L0 emerging from the condenser lens 3 and incident on the center of a cell 21 in the first fly eye lens 4 as shown in FIG. 6 will be discussed by way of example. The center of curvature of the cell 21 is located on broken line O1 in FIG. 6 and decentered from the center of the cell 21 outwardly in the x axis direction.

By this decentering, ray L0 emerging from the condenser lens 3 is rendered into a ray L1 that is substantially parallel to the optical axis O of the illumination optical system in the x-z cross sectional plane (i.e. the plane of FIG. 1).

Similarly, the second fly eye lens 5 renders the light transmitted through it substantially parallel to the optical axis O of the illumination optical system in the y-z cross sectional plane (i.e. the plane of FIG. 2).

The distance from the condenser lens 3 to the second fly eye lens 5 is longer than the distance from the condenser lens 3 to the first fly eye lens 4.

Therefore, the width or diameter of the light having been transmitted through the first and second fly eye lenses 4, 5 is smaller along the y direction than along the x direction.

Thus, the angular range of the light incident on the polarized beam splitting surface 11 of the polarized beam splitting prism 9 is smaller along the y direction, which is advantageous in improving contrast characteristics of the projected image.

In the x-z plane in the above described embodiment shown in FIG. 1, the distance L1 along the optical axis between the corresponding lens cells in the peripheral region of the first fly eye lens 4 and the second fly eye lens 5 and the distance L0 along the optical axis between the lens cells in the central region of the first fly eye lens 4 and the second fly eye lens 5 satisfy the following condition:

$$1.0 < L1/L0 < 1.2 \quad (1).$$

It is more preferred that the following condition be satisfied:

$$1 < L1/L0 < 1.1 \quad (1a).$$

If this condition is satisfied, the difference between the size of the illumination area on the panel surface corresponding to the lens cell in the peripheral region of the fly eye lens and the size of the illumination area on the panel surface corresponding to the lens cell in the central region of the fly eye lens will be small, and therefore the illumination efficiency can be increased.

In the y-z plane in the above described embodiment shown in FIG. 1, the distance L2 along the optical axis between the corresponding lens cells in the peripheral region of the first fly eye lens 4 and the second fly eye lens 5 and the distance L0 along the optical axis between the lens cells in the central region of the first fly eye lens 4 and the second fly eye lens 5 satisfy the following condition:

$$1.0 < L2/L0 < 1.2 \quad (2).$$

It is more preferred that the following condition be satisfied:

$$1 < L2/L0 < 1.1 \quad (2a).$$

If this condition is satisfied, the difference between the size of the illumination area on the panel surface corresponding to the lens cell in the peripheral region of the fly eye lens and the size of the illumination area on the panel surface corresponding to the lens cell in the central region of the fly eye lens will be small, and therefore the illumination efficiency can be increased.

In the image projector of this embodiment, both the conditions (1) and (2) are satisfied, but this is not essential. The image projector or illumination optical system may be designed to satisfy only one of the conditions (1) and (2) and not to satisfy the other condition.

Furthermore, the distance L1 and the distance L2 are set to satisfy the following condition:

$$0.9 < L2/L1 < 1.1 \quad (3).$$

It is more preferred that the following condition be satisfied:

$$0.95 < L2/L1 < 1.05 \quad (3a).$$

Here, the distance L0, L1, L2 between cells refer to the distance between the vertexes of the lens surfaces of the lens cells (i.e. small lenses or lenslets) in the respective fly eye lenses. In other words, the distance L0, L1, L2 between lens cells refer to the distance between the vertex of the small lens surface disposed at the central portion (i.e. closest to the optical axis) or the peripheral portion (i.e. farthest from the optical axis) on the surface of the first fly eye lens on which a plurality of small lens surfaces are provided two-dimensionally and the vertex of the small lens surface on the second fly eye lens corresponding to that small lens surface. This definition of the "lens cell distance (or the distance between the lens cells)" also applies to the second and third embodiments.

In the following, the technical significance of condition (3) will be discussed.

Figure 7:
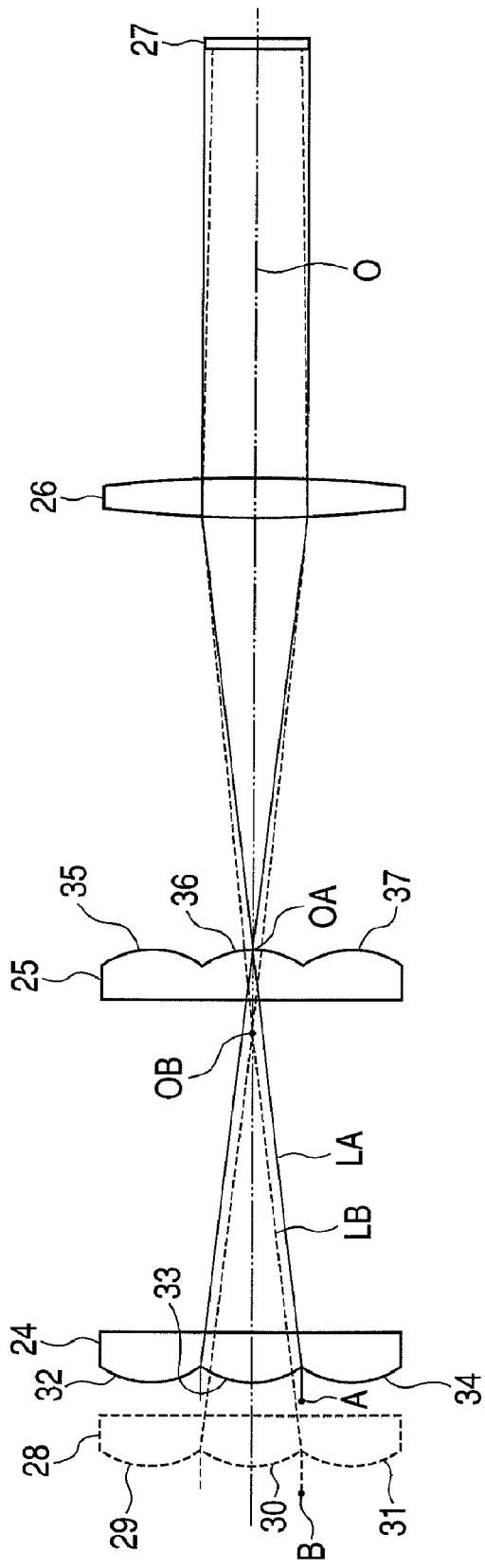
FIG. 7 is a diagram illustrating the relationship between the distance between the fly eye lenses and the illumination area.

FIG. 7 illustrates a change in the illumination area with an increase in the distance between fly eye lenses. Ray or light LA traveling from point A and incident on a peripheral portion of the central lens cell 33 of a first fly eye lens 24 comes to the center OA of the central lens cell 36 on the lens array side of a second fly eye lens 25. This ray is refracted by a condenser lens 26 and incident on the surface of a panel 27.

On the other hand, a first lens array 28 that is disposed farther from the second fly eye lens 25 than the aforementioned first fly eye lens 24 is shown by broken lines in FIG. 7 for illustration of a case in which the distance between the fly eye lenses is larger.

In this case, as shown in FIG. 7, ray or light LB traveling from point B is refracted by a peripheral portion of the central lens cell 30 in the first fly eye lens 28, passes through point OB on the optical axis, and is incident on the central lens cell 36 in the second fly eye lens 25. Then, this ray is refracted by the condenser lens 26 and incident on the surface of the panel 27.

The position of incidence of the ray LB represented by the broken line on the panel surface 27 is located on the inner side of (i.e. closer to the optical axis O than) the position of incidence of the ray LA represented by the solid line.

Figure 8:
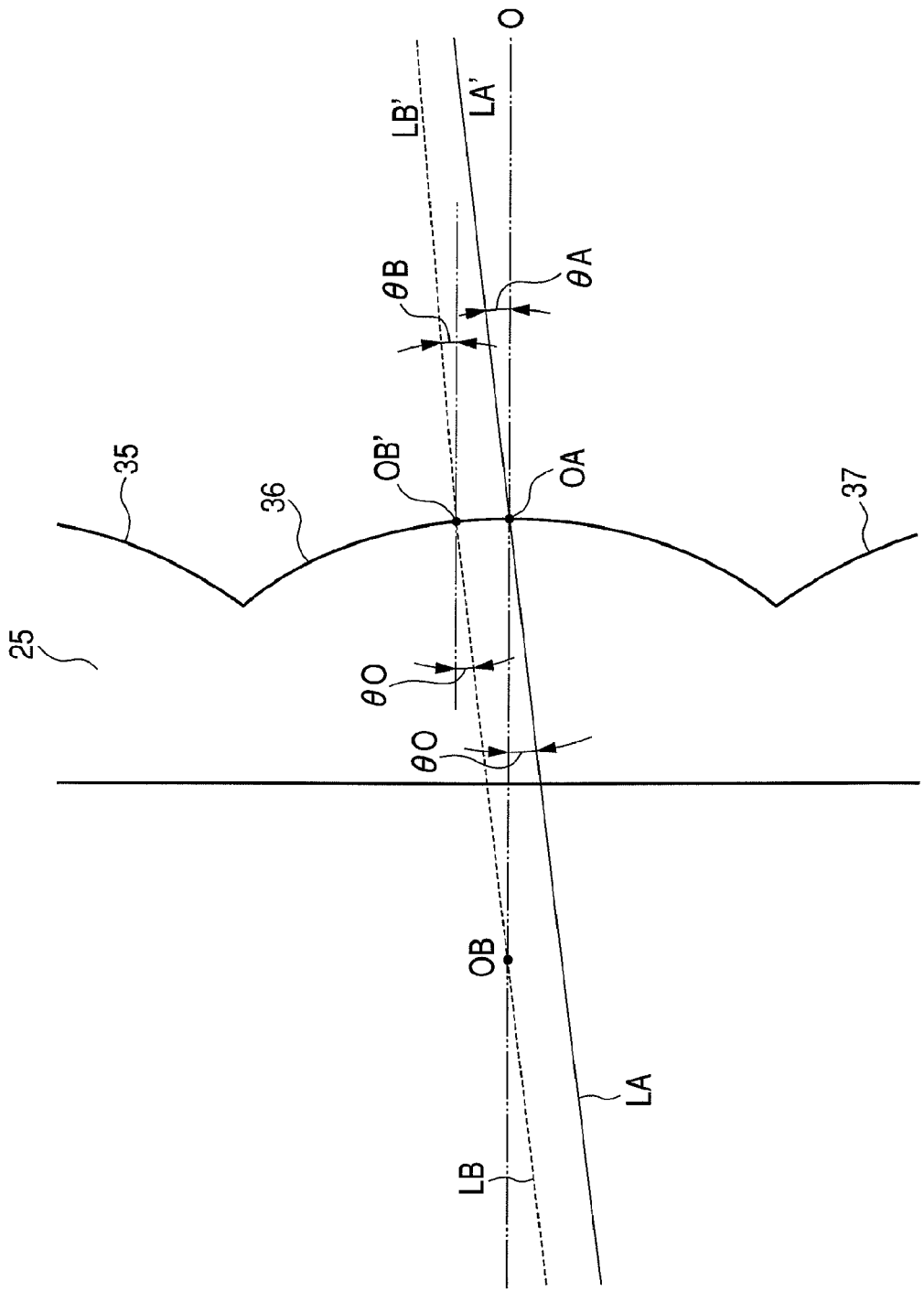
FIG. 8 is an enlarged optical path diagram in the second fly eye lens.

FIG. 8 is an enlarged view of the optical paths near the second fly eye lens 25 for more detailed illustration.

Rays LA and LB come to the light emergent surface 36 of the second fly eye lens 25 with the same inclination with respect to the optical axis O (i.e. at the same angle θ0 relative to the optical axis O). While ray LB is refracted at point OB' on the light emergent surface 36, ray LA is refracted at point OA on the light emergent surface 36. Thus, ray LB is refracted more largely on the light emergent surface than ray LA. Here, the angles formed by rays LA' and LB' emerging from the light emergent surface 36 with the optical axis O are represented by θA and θB respectively.

Then, the following condition holds:

$$\theta A > \theta B.$$

Therefore, the ray represented by the broken line in FIG. 6 is incident on the condenser lens 26 at a smaller angle than the ray represented by the solid line, and therefore incident on the panel surface 10 at a position located slightly inside the position of incidence of the ray represented by the solid line.

From this follows that if the distance along the optical axis between the centers of corresponding cells in the peripheral regions of the first fly eye lens 4 and the second fly eye lens 5 is longer, the illumination area on the panel surface corresponding to the lens cells in the peripheral region will be smaller than the illumination area corresponding to the lens cells in the central region of the fly eye lens.

Conversely, if the distance along the optical axis between the centers of corresponding cells in the peripheral regions of the first fly eye lens 4 and the second fly eye lens 5 is shorter, the illumination area on the panel surface corresponding to the lens cells in the peripheral region will be larger than the illumination area corresponding to the lens cells in the central region of the fly eye lens.

In other words, a decrease in the distance between the cells in the respective fly eye lenses leads to an increase in the magnification, and an increase in the cell distance leads to a decrease in the magnification.

To optimize the illumination area, it is desirable that the illumination magnification be made as equal as possible between the lens cells in the peripheral region with respect to the x direction and the lens cells in the peripheral region with respect to the y direction.

The reason for this is as follows. If the illumination magnification varies among lens cells, the optical system is to be designed in such a way that the image display area (i.e. the effective display area of the LCD panel) is covered by the illumination area corresponding to the lens cell having the lowest magnification. If so designed, the illumination areas on the panel surface (or the illuminated surface) corresponding to lens cells having higher magnifications will be larger than the effective area of the LCD panel. This leads to a loss of light amount. Therefore, it is preferred that the lens cells in the central region, the lens cells in the peripheral region with respect to the x direction, and the lens cells in the peripheral region with respect to the y direction all have the same magnification (or magnifications as equal as possible).

In view of the above, the numerical range defined by condition (1) is set so that the distances along the optical axis between corresponding cells in the first fly eye lens 4 and the second fly eye lens 5 are equal to or substantially equal to each other between the x direction and y direction.

When this condition is satisfied, a large variation in the size of the illumination area due to positional differences among the corresponding lens cells can be prevented.

Figure 9:
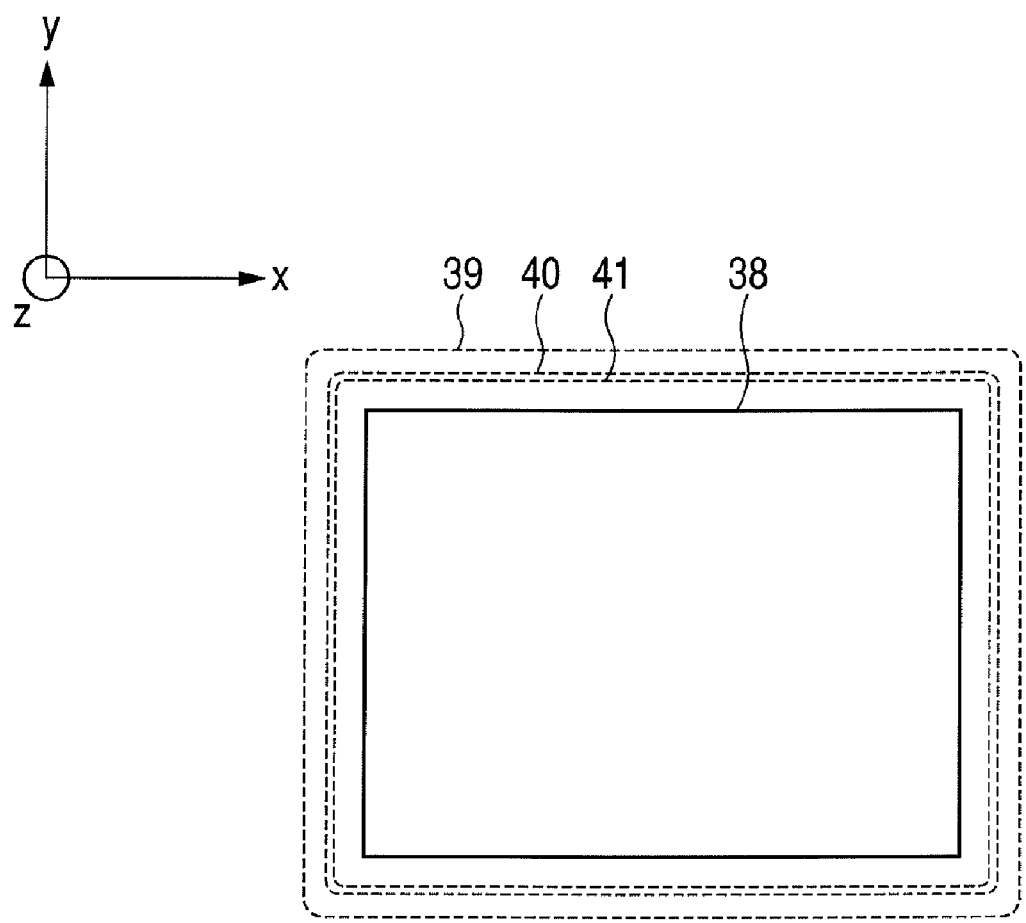
FIG. 9 is a diagram illustrating illumination areas in the first embodiment of the present invention.

FIG. 9 is an illustrative front view of the LCD panel 10. In FIG. 9 are shown an image display portion 38 and the illumination area 39 corresponding to lens cells in the central region of the lens array, the illumination area 40 corresponding to the lens cells in the peripheral region of the lens array with respect to the x direction, and the illumination area 41 corresponding to the lens cells in the peripheral region of the lens array with respect to the y direction. As will be seen from FIG. 9, the illumination areas do not vary among the corresponding lens cells. Therefore, loss of light amount can be made small, and an increase in the light amount on the LCD panel surface 10 can be facilitated.

Figure 10:
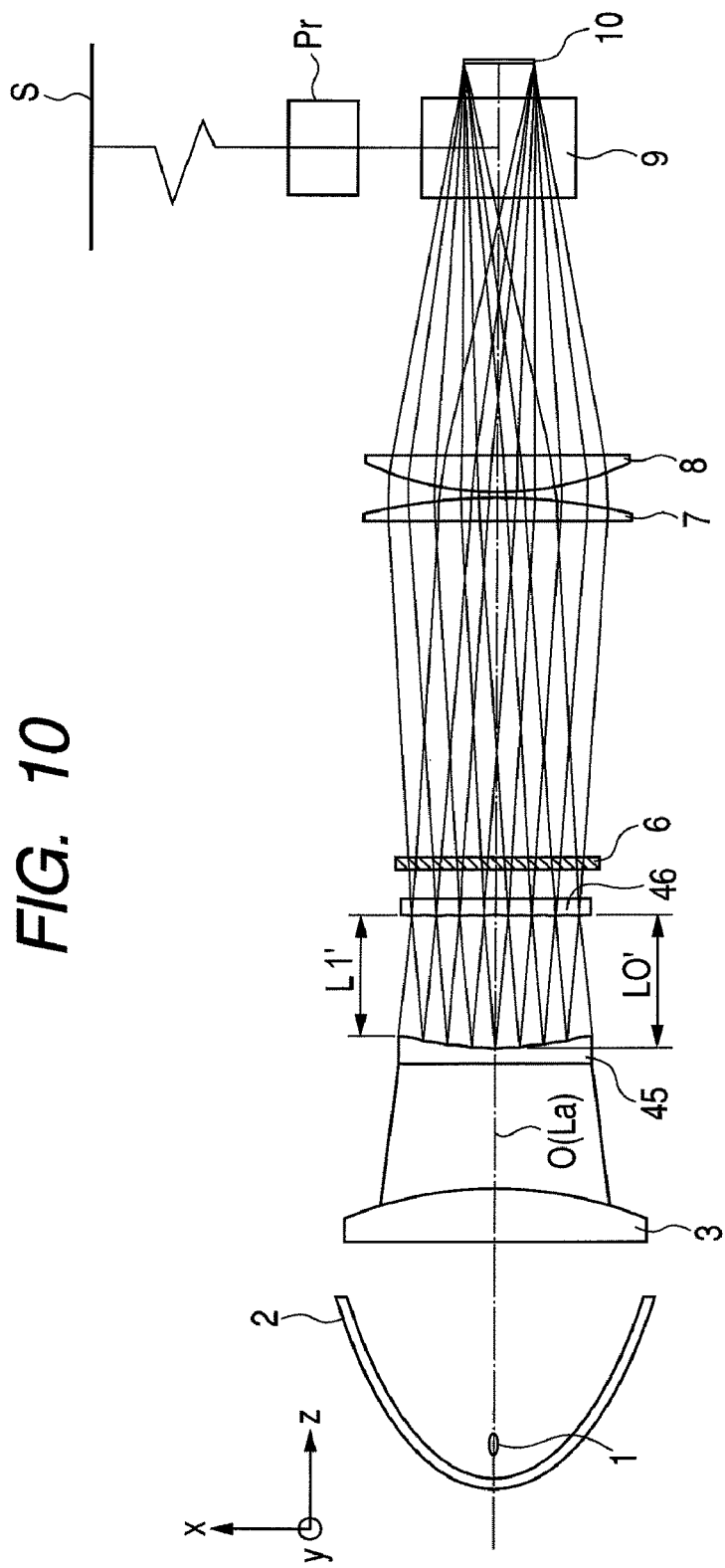
FIG. 10 is a diagram showing the configuration of a second embodiment of the present invention in the x-z cross section.
Figure 11:
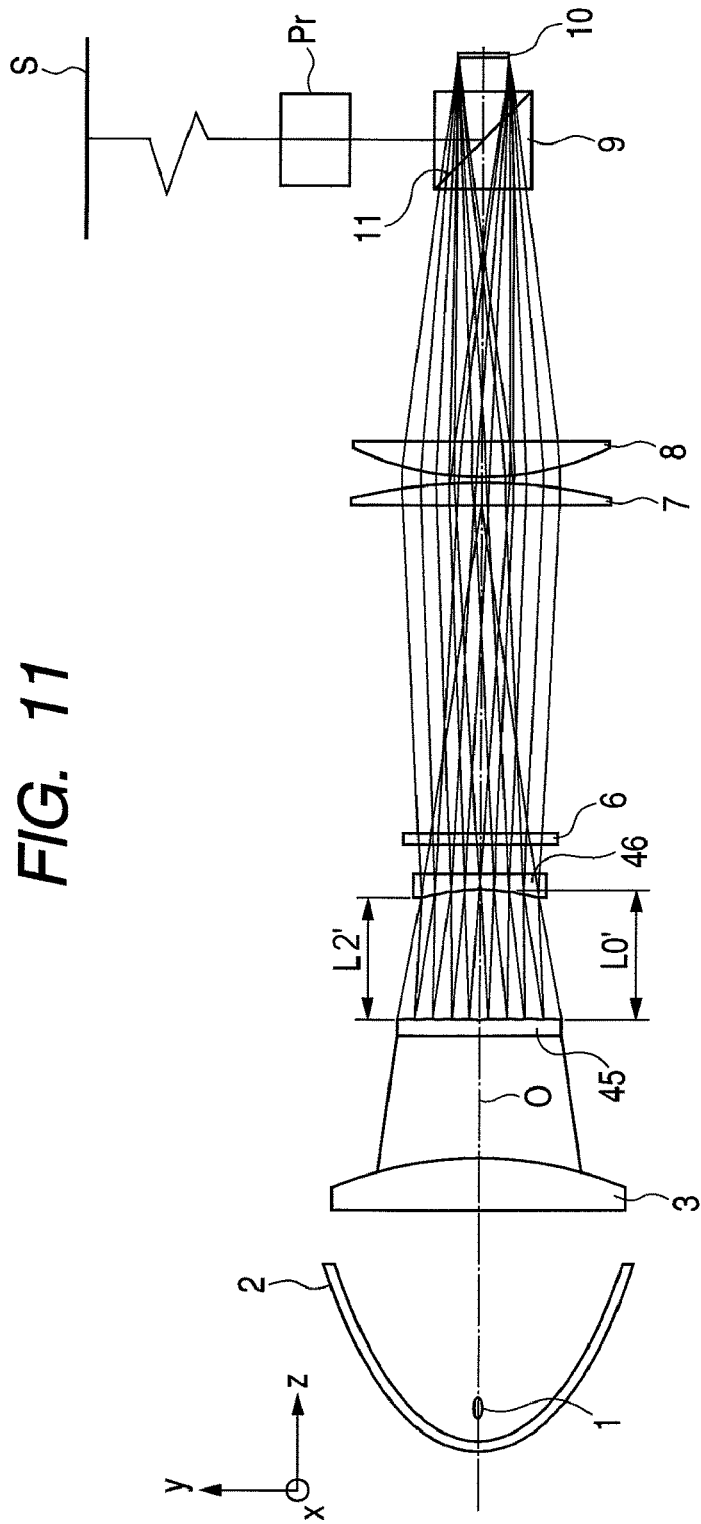
FIG. 11 is a diagram showing the configuration of the second embodiment of the present invention in the y-z cross section.

Furthermore, according to this embodiment, there can be provided an image projector that can project a bright image with high contrast with uniform brightness on the image display element, while the variation in the angle of light on the polarized beam splitting surface of the polarized beam splitter 9 is made small in the cross sectional plane in which optical characteristics of the polarized beam splitter 9 are sensitive to the variation in the angle of light Second Embodiment FIG. 10 schematically illustrates the relevant portions of an image projector having an illumination optical system according to a second embodiment of the present invention. FIG. 11 also illustrates the relevant portions of the image projector in a cross section taken on a plane containing the center axis 0 (optical axis La) in FIG. 10 and perpendicular to the plane of FIG. 10.

The basic configuration and components used in the second embodiment are the same as those in the first embodiment except for the first and second fly eye lenses 45, 46.

In the first embodiment, the first and second fly eye lenses 45, 46 are arranged in such a way that fly eye lens surfaces face away from each other. The second embodiment differs from the first embodiment in that the fly eye lens surfaces are arranged to face each other.

In FIGS. 10 and 11, elements the same as those in FIGS. 1 and 2 are denoted by the same reference signs.

The constitutions of first and second fly eye lenses 45 and 46 used in the second embodiment are the same as the constitutions of the first and second fly eye lenses 4 and 5 used in the first embodiment, but the first and second fly eye lenses 45 and 46 are arranged in such a way that the fly eye lens surfaces face each other.

In the x-z plane shown in FIG. 10, the distance L1' along the optical axis between the corresponding lens cells in the peripheral region of the first fly eye lens 45 and the second fly eye lens 46 and the distance L0' along the optical axis between the lens cells in the central region of the first fly eye lens 45 and the second fly eye lens 46 satisfy the following condition:

$$1.0 < L0'/L1' < 1.2 \qquad (4).$$

It is more preferred that the following condition be satisfied:

$$1.0 < L0'/L1' < 1.1 \qquad (4a).$$

If this condition is satisfied, the difference between the size of the illumination area on the panel surface corresponding to the lens cell in the peripheral region of the fly eye lens and the size of the illumination area on the panel surface corresponding to the lens cell in the central region of the fly eye lens will be small, and therefore the illumination efficiency can be increased.

In the y-z plane in the above described embodiment shown in FIG. 11, the distance L2' along the optical axis between the corresponding lens cells in the peripheral region of the first fly eye lens 4 and the second fly eye lens 5 and the distance L0' along the optical axis between the lens cells in the central region of the first fly eye lens 4 and the second fly eye lens 5 satisfy the following condition $$1.0 < L0'/L2' < 1.2 \qquad (5).$$

It is more preferred that the following condition be satisfied:

$$1.0 < L0'/L2' < 1.1 \qquad (5a).$$

If this condition is satisfied, the difference between the size of the illumination area on the panel surface corresponding to the lens cell in the peripheral region of the fly eye lens and the size of the illumination area on the panel surface corresponding to the lens cell in the central region of the fly eye lens will be small, and therefore the illumination efficiency can be increased.

Furthermore, the distance L1' and the distance L2' are set to satisfy the following condition:

$$0.9 < L2'/L1' < 1.1 \qquad (6).$$

Figure 12:
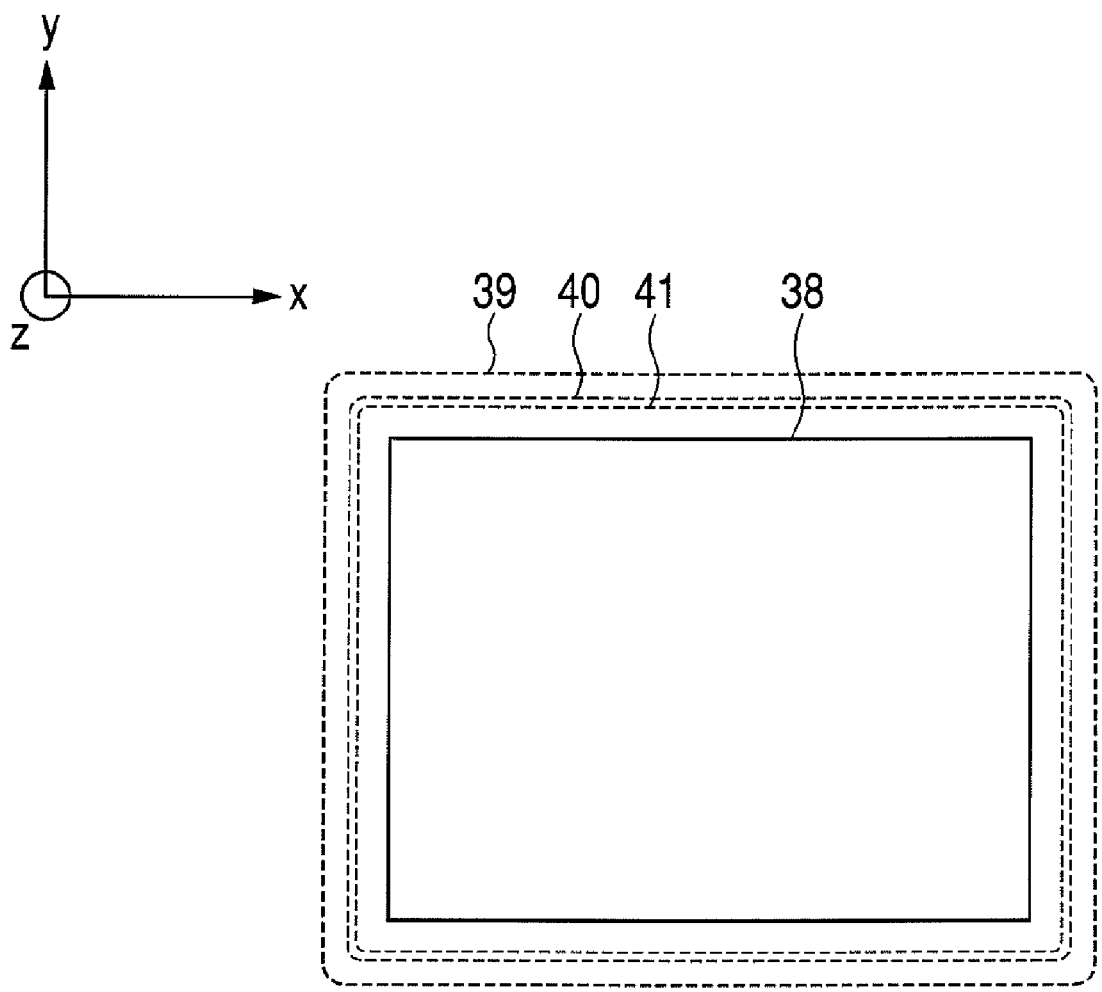
FIG. 12 is a diagram illustrating illumination areas in the second embodiment of the present invention.

If these conditions are satisfied, an illumination area larger than the image display portion 38 by a certain margin is desirably formed on the panel surface 10 as shown in FIG. 12.

The reason for this is the same as that described in the first embodiment.

In FIG. 12 are shown the illumination area 39 corresponding to the lens cells in the peripheral region of the lens array with respect to the x direction, the illumination area 40 corresponding to the lens cells in the peripheral region of the lens array with respect to the y direction, and the illumination area 41 corresponding to the lens cells in the central region of the lens array. Thus, loss of light amount can be made small, and the light amount on the LCD panel surface 10 can easily be increased.

Third Embodiment

Figure 13:
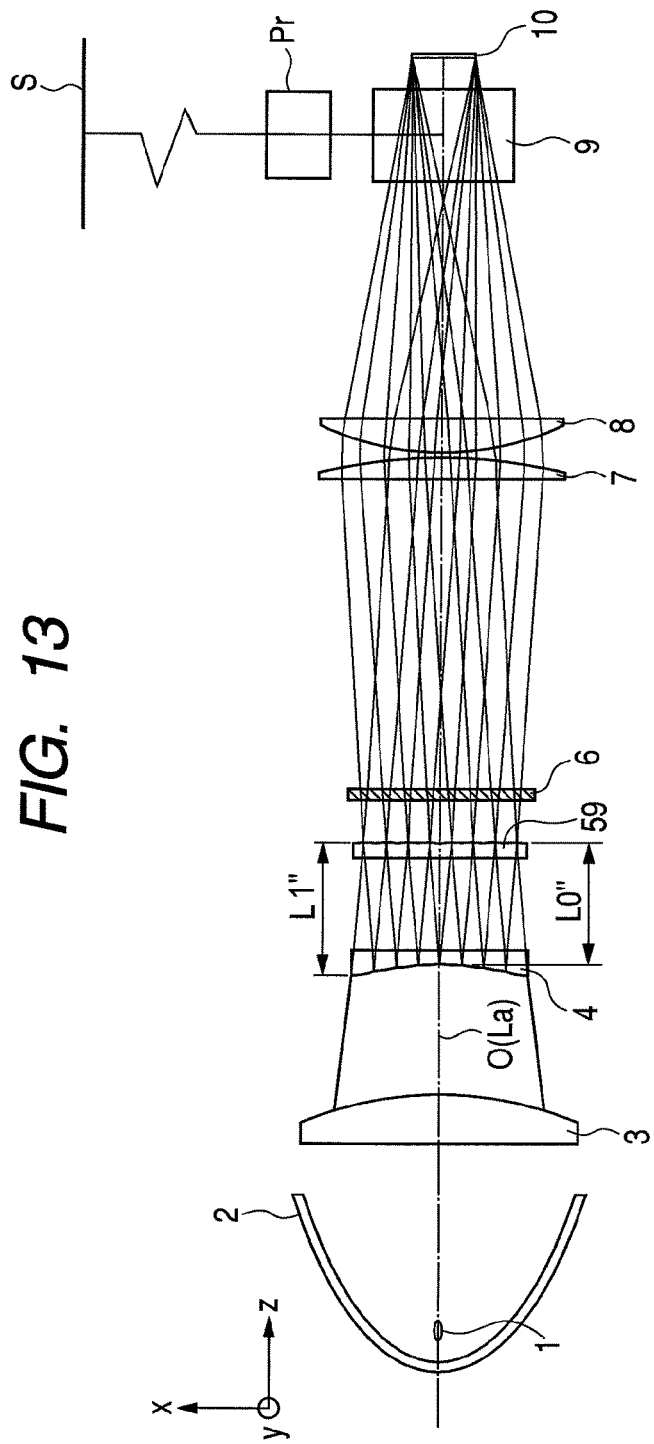
FIG. 13 is a diagram showing the configuration of a third embodiment of the present invention in the x-z cross section.
Figure 14:
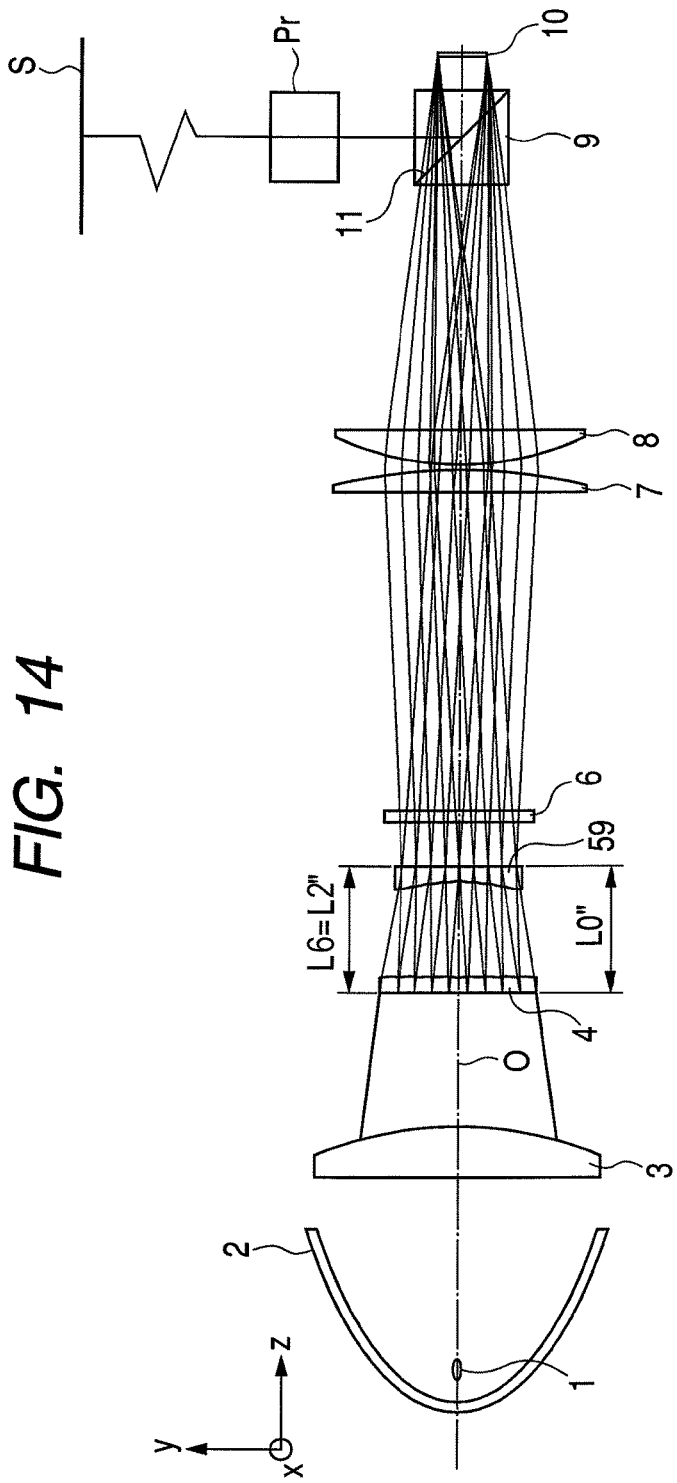
FIG. 14 is a diagram showing the configuration of the third embodiment of the present invention in the y-z cross section.

FIG. 13 schematically illustrates the relevant portions of an image projector having an illumination optical system according to a third embodiment of the present invention. FIG. 14 also illustrates the relevant portions of the image projector in a cross section taken on a plane containing the center axis 0 (or optical axis La) in FIG. 13 and perpendicular to the plane of FIG. 13.

The basic configuration and components used in the third embodiment are the same as those in the first embodiment except for the first and second fly eye lenses 59.

In FIGS. 13 and 14, elements the same as those in FIGS. 1 and 2 are denoted by the same reference signs.

The constitution of a first fly eye lens 4 is the same as the first fly eye lens 4 used in the first embodiment. A second fly eye lens 59 has a cylindrical surface having a negative refracting power in the y-z plane on the incidence side and a fly eye lens having lens cells arranged two-dimensionally in the x-y plane on the light emerging side.

In the x-z plane in the above described embodiment shown in FIG. 13, the distance L1" along the optical axis between the corresponding lens cells in the peripheral region of the first fly eye lens 4 and the second fly eye lens 59 and the distance L0" along the optical axis between the lens cells in the central region of the first fly eye lens 4 and the second fly eye lens 59 satisfy the following condition:

$$1.0 < L1''/L0'' < 1.2 \tag{7}$$

It is more preferred that the following condition be satisfied:

$$1.0 < L1''/L0'' < 1.1 \tag{7a}$$

If this condition is satisfied, the difference between the size of the illumination area on the panel surface corresponding to the lens cell in the peripheral region of the fly eye lens and the size of the illumination area on the panel surface corresponding to the lens cell in the central region of the fly eye lens will be small, and therefore the illumination efficiency can be increased.

In the y-z plane in the above described embodiment shown in FIG. 14, the distance L2" along the optical axis between the corresponding lens cells in the peripheral region of the first fly eye lens 4 and the second fly eye lens 59 and the distance L0" satisfies the following condition:

$$0.9 < L2''/L0'' < 1.1 \tag{8}$$

It is more preferred that the following condition be satisfied:

$$0.95 < L2''/L0'' < 1.05 \tag{8a}$$

It is still more preferred that the following condition be satisfied:

$$L2'' = L0''$$

Furthermore, the distance L1" and the distance L2" are set to satisfy the following condition:

$$0.9 < L2''/L1'' < 1.1 \tag{9}$$

Figure 15:
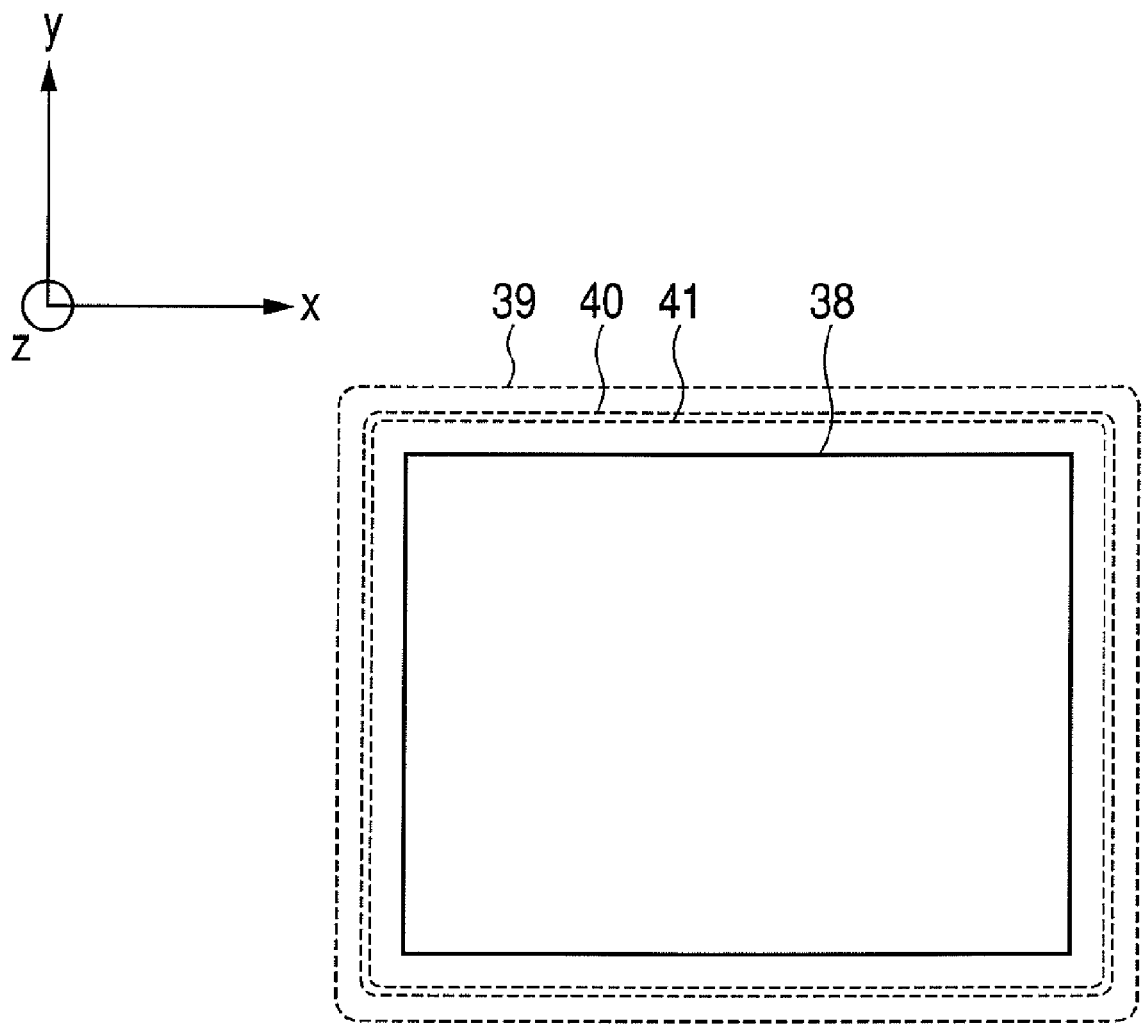
FIG. 15 is a diagram illustrating illumination areas in the third embodiment of the present invention.
Figure 16:
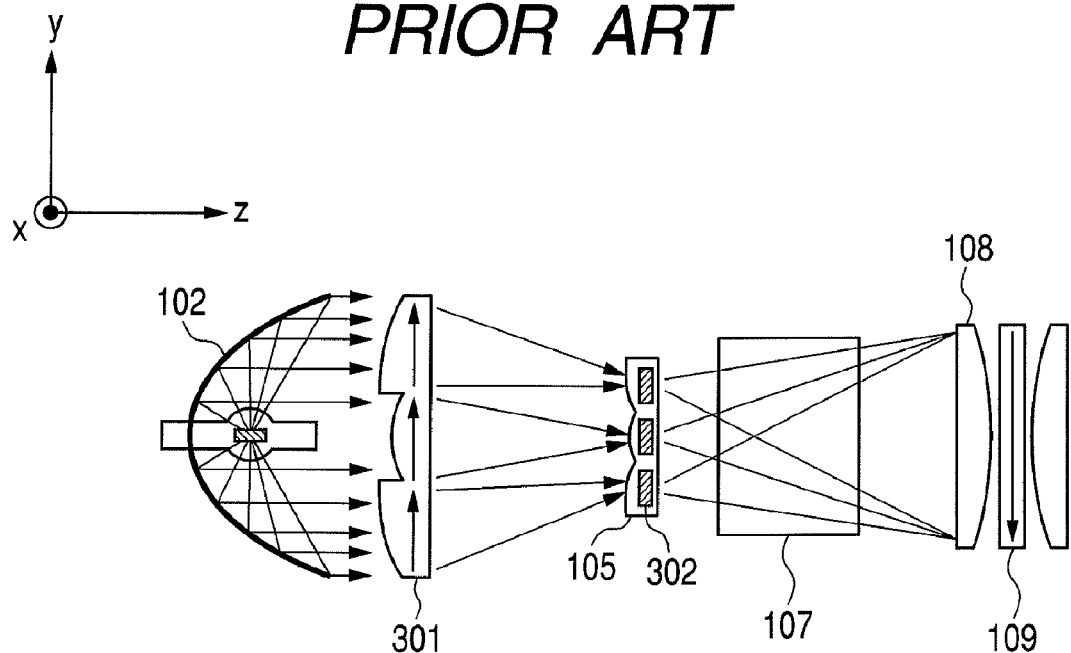
FIG. 16 is a diagram showing the configuration of a conventional image projector.

If these conditions are satisfied, the illumination area larger than the image display portion 38 by a certain margin is desirably formed on the LCD panel surface 10 as shown in FIG. 15. The reason for this is the same as that described in the first embodiment.

In FIG. 15 are shown the illumination area 39 corresponding to the lens cells in the peripheral region of the lens array with respect to the x direction, the illumination area 40 corresponding to the lens cells in the peripheral region of the lens array with respect to the y direction, and the illumination area 41 corresponding to the lens cells in the central region of the lens array.

In conditions (1), (2), (4), (5), and (7) presented in the above described embodiments, relationship of L1 and L0, L2 and L0, L1' and L0', L2' and L0', L1" and L0", and L2" and L0" are specified respectively. In these conditions, the numerator and the denominator may be reversed. When the numerator and the denominator are reversed, the lens cells of the first and second fly eye lenses in the embodiments should be provided on the reverse side of the fly eye lenses.

Thus, loss of light amount can be made small, and the light amount on the panel surface can easily be increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130620, filed May 19, 2008, which is hereby incorporated by reference herein in its entirety.

What is claimed is:

1. An illumination optical system comprising:
   a condenser that converges light emerging from a light source so that convergent light emerges from the condenser;
   a first lens array that converts convergent light emerging from the condenser into a plurality of parallel bundles of light in a first cross sectional plane that contains an optical axis of the illumination optical system;
   a second lens array that converts a plurality of convergent bundles of light emerging from the first lens array into a plurality of parallel bundles of light in a second cross sectional plane that contains the optical axis of the illumination optical system and perpendicular to the first cross sectional plane; and
   a polarized beam splitting surface that guides the plurality of bundles of light emerging from the second lens array to an illuminated surface, wherein
   light incident on the condenser is compressed by the condenser, the first lens array, and the second lens array,
   the second cross sectional plane is parallel to the normal of the polarized beam splitting surface;
   let L0 be a distance on the optical axis of the illumination optical system between the surface of a lens cell in the first lens array and the surface of a lens cell in the second lens array, and let L1 be the distance between the surface of an outermost lens cell in a direction perpendicular to the optical axis, among lens cells in the first lens array and the surface of an outermost lens cell in the direction perpendicular to the optical axis, among lens cells in the second lens array, in the first cross sectional plane, a value obtained by dividing the longer one of distances L0 and L1 by the shorter one of distances L0 and L1 is larger than 1 and smaller than 1.2.

2. An illumination optical system according to claim 1, wherein let L2 be a distance along the optical axis direction between the surface of an outermost lens cell among lens cells in the first lens array and the surface of an outermost lens cell among lens cells in the second lens array, in the second cross sectional plane, a value obtained by dividing the longer one of distances L0 and L2 by the shorter one of distances L0 and L2 is larger than 1 and smaller than 1.2.

3. An illumination optical system according to claim 1, wherein let L2 be a distance along the optical axis direction between the surface of an outermost lens cell among lens cells in the first lens array and the surface of an outermost lens cell among lens cells in the second lens array, in the second cross sectional plane, the following condition is satisfied:

$0.9 < L2/L1 < 1.1$.

4. An illumination optical system according to claim 1, wherein let L2 be a distance along the optical axis direction between the surface of an outermost lens cell among lens cells in the first lens array and the surface of an outermost lens cell among lens cells in the second lens array, in the second cross sectional plane, the following conditions are satisfied:

$1 < L1/L0 < 1.2$, and $1 < L2/L0 < 1.2$.

5. An illumination optical system according to claim 1, wherein let β be a compression ratio of light in the first cross sectional plane, and let α be a compression ratio in the second cross sectional plane, the following conditions are satisfied:

$\alpha < 1$, $\beta < 1$, and $\alpha < \beta$ wherein the compression ratio is defined as the value obtained by dividing the width of light incident on the first lens array or the second lens array by the width of the light just after the emergence from the condenser.

6. An illumination optical system according to claim 1, wherein the surfaces of the first and second lens arrays on which lens cells are arranged face away from each other.

7. An illumination optical system according to claim 1, wherein the center of curvature of each of lens cells in the first lens array and second lens array other than lens cells in central portions of the first lens array and the second lens array is arranged to be decentered from the center of the lens cell in a direction away from the optical axis of the illumination optical axis in the first cross sectional plane or in the second cross sectional plane.

8. An illumination optical system comprising:
a condenser that converges light emerging from a light source so that convergent light emerges from the condenser;
a first lens array that converts convergent light emerging from the condenser into a plurality of parallel bundles of light in a first cross sectional plane that contains an optical axis of the illumination optical system;
a second lens array that converts a plurality of convergent bundles of light emerging from the first lens array into a plurality of parallel bundles of light in a second cross sectional plane that contains the optical axis of the illumination optical system and perpendicular to the first cross sectional plane; and
a polarized beam splitting surface that guides the plurality of bundles of light emerging from the second lens array to an illuminated surface, wherein
light incident on the condenser is compressed by the condenser, the first lens array, and the second lens array,
the second cross sectional plane is parallel to the normal of the polarized beam splitting surface;
let L0 be a distance on the optical axis of the illumination optical system between the surface of a lens cell in the first lens array and the surface of a lens cell in the second lens array, and let L2 be the distance between the surface of an outermost lens cell in a direction perpendicular to the optical axis, among lens cells in the first lens array and the surface of an outermost lens cell in the direction perpendicular to the optical axis, among lens cells in the second lens array, in the second cross sectional plane, a value obtained by dividing the longer one of distances L0 and L2 by the shorter one of distances L0 and L2 is larger than 1 and smaller than 1.2.

9. An illumination optical system according to claim 8, wherein let L1 be a distance along the optical axis direction between the surface of an outermost lens cell among lens cells in the first lens array and the surface of an outermost lens cell among lens cells in the second lens array, in the first cross sectional plane, the following condition is satisfied:

$0.9 < L2/L1 < 1.1$.

10. An illumination optical system according to claim 8, wherein let L1 be a distance along the optical axis direction between the surface of an outermost lens cell among lens cells in the first lens array and the surface of an outermost lens cell among lens cells in the second lens array, in the first cross sectional plane, the following conditions are satisfied:

$1 < L1/L0 < 1.2$, and $1 < L2/L0 < 1.2$.

11. An illumination optical system according to claim 8, wherein let β be a compression ratio of light in the first cross sectional plane, and let α be a compression ratio in the second cross sectional plane, the following conditions are satisfied:

$\alpha < 1$, $\beta < 1$, and $\alpha < \beta$ wherein the compression ratio is defined as the value obtained by dividing the width of light incident on the first lens array or the second lens array by the width of the light just after the emergence from the condenser.

12. An illumination optical system according to claim 8, wherein the surfaces of the first and second lens arrays on which lens cells are arranged face away from each other.

13. An illumination optical system according to claim 8, wherein the center of curvature of each of lens cells in the first lens array and second lens array other than lens cells in central portions of the first lens array and the second lens array is arranged to be decentered from the center of the lens cell in a direction away from the optical axis of the illumination optical axis in the first cross sectional plane or in the second cross sectional plane.

14. An image projector comprising:
an image display element;
an illumination optical system according to claim 1 that illuminates the image display element; and
a projection optical system that projects an image of the image display element.

15. An image projector comprising;
an image display element;
an illumination optical system according to claim 8 that illuminates the image display element; and
a projection optical system that projects an image of the image display element.

* * * * *